United States Patent Office 3,179,527
Patented Apr. 20, 1965

3,179,527
COATING COMPOSITION
Mark S. Vukasovich, Parma, Herbert L. Johns, Cleveland, and Eugene Wainer, Shaker Heights, Ohio, assignors to Horizons, Incorporated, a corporation of New Jersey
No Drawing. Filed Sept. 15, 1964, Ser. No. 396,724
6 Claims. (Cl. 106—85)

This application is a continuation-in-part of the United States patent application Serial No. 133,581, filed August 24, 1961, now Patent No. 3,167,439.

This invention relates to a paint based on a cold setting mixture of inorganic oxides. More particularly, it relates to one manner in which shelf stability is imparted to a paint which sets at room temperature into a hard mass, resistant to water and capable of retaining its physical structure at temperatures in excess of 2500° F.

Briefly the cold setting paint of the present invention is based on four inorganic oxides, namely: $Al_2O_3$, $CaO$, $SiO_2$ and $P_2O_5$, in suitable proportions, in a vehicle which may be a vaporizable carrier comprising either water or an aqueous solution or an organic liquid, or a combination of organic liquids plus water or aqueous solution.

Compositions of the nature described set rapidly, even at room temperature, as described in Yedlick et al., United States Patent 2,687,967, relating to a method of delaying the set of such compositions involving preparation and storage of such compositions under refrigeration, or at temperatures well below room temperature.

The paint compositions described above suffer from one distinct disadvantage, in that they are not shelf stable. The paints set up in bulk, and hence must be mixed immediately prior to use or stored under refrigeration as described in the aforesaid U.S. Patent 2,687,967. The present invention is directed to overcoming this disadvantage.

One object of the invention is to provide paint compositions which may be stored in closed containers at room temperature for indefinite periods without undergoing a setting reaction and which, when taken from storage, set into a hard water-resistant mass without the application of heat from an external source.

A more specific object is to provide shelf stable compositions useful in the protection and painting of concrete, ceramic, wood, metal or other suitable substrate, and hence of particular utility for applications in the building industry, e.g. to siding, shingles, decorative panels, and as highway paint, paint for cement or cinder blocks, clay bricks or the like, which are shelf stable at room temperature and do not react or set up for cure until applied to the desired surface.

Preferably the shelf stable compositions constituting the present invention are formulated by adding either silica or lime to an acidic solution of aluminum phosphate in which the relative proportions of $Al_2O_3$ to $P_2O_5$ are within the range of 1 mole of $Al_2O_3$ for each two to three moles of $P_2O_5$. However, the initial step in the formulation of the composition may comprise prereacting at least one oxide of the group consisting of $CaO$, $Al_2O_3$, and $SiO_2$ with either $P_2O_5$ or $H_3PO_4$ to form a reaction product and then mixing the reaction product with additional material consisting of these oxides or compounds formed from at least two of the oxides.

The amount of water or other vaporizable liquid vehicle in which the aluminum phosphate is dissolved should constitute not more than about 50% by weight of the aluminum phosphate solution which is preferably a somewhat viscous liquid at this stage of the formulation. Consequently it is preferable to use either $P_2O_5$ or concentrated phosphoric acid of about 85% $H_3PO_4$ concentration when preparing the aluminum phosphate.

For most purposes, the two remaining constituents are added to the aluminum phosphate as a calcium silicate or a calcium aluminum silicate, or mixtures of the two, the principal exception being a consequence of utilization of a calcareous substrate to furnish a substantial portion of the lime in the coating composition, or the use of other substrate to furnish silica or alumina in the resultant coating.

A preferred calcium silicate is wollastonite, a particularly pure mineral in which the ratio of $CaO$ to $SiO_2$ is substantially equimolar. The wollastonite is preferably comminuted to minus 200 mesh (Tyler standard) before incorporation in the paint composition.

Others of the constituents may be added to the formulation, within limits. The effect of added silica appears to depend to some extent on the particle size of the silica. Additions of fine silica (minus 325 mesh, Tyler standard) produces a paint which forms open cracks when exposed to water particularly at elevated temperatures, whereas additions of coarser silica (plus 60 mesh) do not produce this result. Up to about 40% by weight of silica (minus 140 mesh) may be added to the composition without producing a loose crumbly coating. The permissible amount of silica which may be added appears to depend also, in part, on the amount of alumina in the system, the higher the alumina, the higher the amount of silica which may be tolerated without unduly prolonging the interval required for setting the composition.

The usual pigments and organic colorants may also be added to the above compositions. With the additives listed below, typical compositions have exhibited the following colors:

| Addition: | Resulting paint |
|---|---|
| None | White. |
| $TiO_2$ | White. |
| Carbon | Black. |
| Iron oxide | Red. |
| Chromium oxide | Green. |
| Lead chromate | Yellow. |
| Cobalt alumina stain | Blue. |

Instead of water, it is possible to use any of a number of water compatible solvents or mixtures of the same as the vaporizable liquid carrier for the four oxides constituting the basis of the paint composition. These may be taken from the group consisting of alcohols, ketones, glycols, glycol ethers and mixtures thereof. The use of such liquids permits a ready adjustment in the viscosity of the paint and permits the working time to be extended substantially.

THE PRESENT INVENTION

The present invention is directed to improving the shelf stability of compositions of the type described above and to provide compositions which may be stored in closed containers for extended time intervals without experiencing the setting up reaction which, when it occurs before use, renders the compositions unfit for their intended application as paints or protective coatings.

Several modes of avoiding the premature setting up reaction have been investigated and have been found to overcome the disadvantage noted in the prior art, namely (1) modification of the composition and (2) modification of the manner in which it is prepared. The first of these inventions is covered in our copending application Serial No. 133,581, filed August 24, 1961, the disclosure of which is incorporated herein by reference.

SHELF STABILITY BY PROCESSING MODIFICATION

It has also been found possible to increase the shelf stability of compositions containing more than 10% by weight of wollastonite, by modifying the manner in which the composition is prepared.

In preparing the paints described above it was observed that a pronounced exothermic reaction took place when the aluminum phosphate and silica were brought together, particularly in the presence of small amounts of mineral acids and aluminum chloride. It was further noted that the mixture was still free-flowing after the heat of reaction had dissipated, and that if wollastonite was added to the reacted materials at this time, as much as 30% by weight of wollastonite could be added to some compositions without producing a paint which set up on storage in a closed container.

Setting up of these paints in which wollastonite had been added to a pre-reacted mixture was found to be accelerated by the addition of a small amount of water, usually less than about 5% by weight. Coatings produced with paints formulated in this manner, i.e. with a deferred addition of wollastonite, when set up on concrete surfaces, possessed a toughness, adherence and water resistance comparable to that of the coatings produced from the paints with poor shelf stability applied directly after preparation.

Similar behavior was noted with other compositions wherein an exothermic pre-reaction could be affected. Several alternative methods of obtaining the pre-reaction are illustrated in the examples which follow.

In Example I the presence of aluminum chloride and mineral acid appear to contribute to the evolution of heat; in Example II the heat is obtained largely from the reaction of $P_2O_5$ with aluminum hydroxide; and in Example III the heat for "prereaction" is obtained by refluxing the illustrated composition which does not react spontaneously. The resulting pre-reacted composition was not capable of retaining much more than 10% by weight of wollastonite and hence offered no apparent advantages over the low wollastonite paints described in our copending patent application.

Three compositions illustrating this aspect of the invention are set forth below (all parts being by weight):

*Example I*

Pre-reacted: [1]
| | | |
|---|---|---|
| Alkophos-CE [2] | 32 | |
| Silica—140 mesh | 40 | |
| Hydrochloric acid of specific gravity 1.19 | 14 | 70 |
| Aluminum chloride | 14 | |
| | 100 | |
| Wollastonite | 30 | |
| | 100 | |

[1] The pre-reactants were stored overnight before adding the wollastonite.
[2] Alkophos-CE is an acidic monoaluminum phosphate marketed by Monsanto Chemical Company.

*Example II*

Pre-reacted:
| | | |
|---|---|---|
| Aluminum hydroxide } $Al_2O_3 \cdot 3P_2O_5$ | 33 | |
| Phosphorus pentoxide | | |
| Water | 34 | 80 |
| Silica—140 mesh | 33 | |
| | 100 | |
| Wollastonite [1] | 20 | |
| | 100 | |

[1] Wollastonite was added the next day.

*Example III*

Pre-reacted: [1]
| | | |
|---|---|---|
| Alkophos-CE | 45 | |
| Silica—140 mesh | 45 | 90 |
| Nitric acid of specific gravity 1.42 | 10 | |
| | 100 | |
| Wollastonite | 10 | |
| | 100 | |

[1] The pre-reactants were refluxed for 2½ hours, then allowed to cool overnight before adding the wollastonite.

The resulting compositions were found to exhibit good shelf stability even though they contained wollastonite in substantial amounts, and it appears that formulations which may possess a low-viscosity, relatively high water content and high mineral acid content are quite stable when stored in sealed containers if the wollastonite was added after the pre-reaction has been effected, either as a spontaneous exothermic reaction or by the application of heat to the mixture.

When reduced to a dry basis, the compositions of Examples I, II and III are as follows:

| | I | II | III |
|---|---|---|---|
| $Al_2O_3$ | 8.6 | 8.7 | 6.5 |
| $P_2O_5$ | 11.2 | 27.6 | 20.9 |
| $SiO_2$ | 60.4 | 50.6 | 65.7 |
| $CaO$ | 19.9 | 13.2 | 6.9 |

In Examples I, II and III above, silica was employed in the pre-reaction formulation, but it is also possible to utilize calcium silicate or calcium alumino-silicate in suitable proportions, instead of the silica, or as a substitute for a portion of the silica. By pre-reacting calcium silicate with phosphoric acid, a mixture is obtained which reacts with kaolin to produce an air setting cement. The following example illustrates the preparation of one such pre-reacted mixture.

*Example IV*

One mole of calcium silicate, and 2 moles of $P_2O_5$ are mixed in the presence of 6 moles of water. The resultant liquid is the "pre-reaction" product. When 1 mole of the $CaSiO_3 \cdot 2P_2O_5$ so obtained is reacted with 1 mole of kaolin, a mixture capable of being painted or sprayed is obtained. The material sets up more slowly than the $Al_2O_3$, $P_2O_5$, $CaSiO_3$ paint system first described above but eventually develops a very hard bright surface.

In addition to the foregoing, the use of this pre-reacted calcium silicophosphate in compositions such as those described above, improves brightness and reflectancy.

Compositions were prepared containing varying amounts of pre-reacted calcium silicophosphate in the range of 8 to 24 parts, added to a base composition of 38 parts Alkophos, and 10 parts of methyl ethyl ketone. All produced air-setting cements. It thus appears that cementitious masses are available from properly chosen areas in a quaternary diagram involving calcium oxide, silicon dioxide, aluminum oxide, and phosphate materials; namely between about 6 and 9% $Al_2O_3$, between 6 and 20% $CaO$, between 50 and 70% $SiO_2$, and between 10 and 30% $P_2O_5$.

The shelf stable compositions prepared in accordance with the preceding description are readily suited to packaging and distribution. Since they set to hard, durable cementitious masses, they are useful in the production of molded shapes of widely varying dimensions, and may be utilized for this purpose, either as formulated or with additional filler materials. Furthermore, the compositions are particularly useful as potting compositions in place of commonly used resins which tend to become brittle and to crack upon extended exposures to various environments.

A particularly preferred substrate to which the above described paints may be applied is aluminum. Adhesion to metallic aluminum is substantial and adhesion to other metals may be enhanced by etching or otherwise roughening, or by aluminizing the surface.

Adhesion to aluminum surfaces is improved by adding minor amounts, e.g. up to about 2% by weight of oxides of metals which are more electronegative than aluminum, to the paint formulation. Suitable oxides added for this purpose include the oxides of tin, lead, copper, zinc, cadmium, antimony, bismuth, iron and the like.

Adherence is further improved if the surface is dried at temperatures between about 100° C. and 125° C. after it has been painted with a paint to which one of the above oxides has been added.

Having now described preferred embodiments of the invention in accordance with the patent statutes it is not intended that the invention be limited except as required by the appended claims.

We claim:
1. A paint composition consisting essentially of a complex hydrated calcium-alumino-silicophosphate analyzing between 6% and 9% $Al_2O_3$; between 6% and 20% CaO; between 50% and 70% $SiO_2$ and between 10% and 30% $P_2O_5$ and sufficient water to set the composition.

2. The method of formulating the paint composition of claim 1 which comprises pre-reacting at least one member selected from the group consisting of CaO, $Al_2O_3$, and $SiO_2$, with one member selected from the group consisting of $P_2O_5$ and $H_3PO_4$ to form a reaction product, and mixing the reaction product with additional material selected from the oxides of said first group and compounds formed from at least two of said oxides, in proportions which yield the composition of claim 1.

3. A methd of coating base material containing substantial amounts of an oxide selected from the group consisting of CaO, $Al_2O_3$ and $SiO_2$ which comprises preparing a liquid paint composition as defined in claim 1, with the exception that there is omitted therefrom a substantial proportion of the oxide which is a constituent of the base material to be coated, applying the resulting liquid to the base and setting the same to a hard water resistant coating.

4. A method of preparing the coating composition of claim 1 which comprises:
adding finely divided silica to an aluminum phosphate solution, in the presence of a material selected from the group consisting of aluminum chloride and free mineral acids, whereby an exothermic reaction occurs;
and thereafter, after the heat evolved by the exothermic reaction has been dissipated, adding wollastonite to the mixture.

5. The method of claim 4 wherein a small amount of water is added to the mixture along with the wollastonite.

6. The method of claim 4 wherein the amount of wollastonite comprises up to 30% by weight of the composition.

References Cited by the Examiner
UNITED STATES PATENTS

| | | | |
|---|---|---|---|
| 2,687,967 | 8/54 | Yedlick | 106—39 |
| 2,966,421 | 12/60 | Zimmerman et al. | 106—40 |
| 2,992,930 | 7/61 | Wheeler | 106—40 |
| 3,041,205 | 6/62 | Iler | 106—40 |
| 3,097,954 | 7/63 | Whitaker | 106—286 |

TOBIAS E. LEVOW, *Primary Examiner.*